United States Patent
Keeling et al.

(10) Patent No.: US 9,876,535 B2
(45) Date of Patent: Jan. 23, 2018

(54) MODULAR INDUCTIVE POWER TRANSFER POWER SUPPLY AND METHOD OF OPERATION

(71) Applicant: QUALCOMM Incorporated, San Diego, CA (US)

(72) Inventors: Nicholas A Keeling, Auckland (NZ); Michael Kissin, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 13/773,474

(22) Filed: Feb. 21, 2013

(65) Prior Publication Data
US 2014/0232197 A1  Aug. 21, 2014

(51) Int. Cl.
*H01F 38/14* (2006.01)
*H04B 5/00* (2006.01)
(Continued)

(52) U.S. Cl.
CPC .............. *H04B 5/0037* (2013.01); *B60L 3/00* (2013.01); *B60L 3/04* (2013.01); *B60L 11/182* (2013.01); *B60L 11/1824* (2013.01); *B60L 11/1829* (2013.01); *B60L 11/1833* (2013.01); *B60L 11/1877* (2013.01); *H02J 5/005* (2013.01); *H02M 3/1584* (2013.01); *B60L 2230/10* (2013.01); *H02J 7/025* (2013.01); *H02M 2001/0077* (2013.01); *Y02T 10/7005* (2013.01); *Y02T 10/705* (2013.01);
(Continued)

(58) Field of Classification Search
CPC . H02J 17/00; H02J 5/005; H02J 7/025; B60L 11/1826; B60L 11/182; B60L 11/1824; B60L 11/1833; B60L 11/1877; B60L 3/00; B60L 3/04; H02M 3/1584; H02M 2001/0077
See application file for complete search history.

(56) References Cited

U.S. PATENT DOCUMENTS

| 3,663,828 | A | * | 5/1972 | Low et al. ................. 307/83 |
| 7,772,802 | B2 |   | 8/2010 | Manico et al. |

(Continued)

FOREIGN PATENT DOCUMENTS

| CN | 101835653 A | 9/2010 |
| CN | 102868234 A | 1/2013 |
| DE | 102010043154 A1 | 5/2012 |

OTHER PUBLICATIONS

International Search Report and Written Opinion—PCT/US2014/015582—ISA/EPO—dated Jul. 16, 2014.
(Continued)

*Primary Examiner* — Rexford Barnie
*Assistant Examiner* — Terrence Willoughby
(74) *Attorney, Agent, or Firm* — Knobbe, Martens, Olsen & Bear LLP

(57) ABSTRACT

This disclosure provides systems, methods and apparatus for connecting and operating an AC source to a load. In one aspect a power supply topology is provided which may be of particular use in the area of wireless power transfer. The topology allows for multiple sources to be operatively connected to a single conductive structure configured to generate a field, maintaining overall system power while lowering the power output of each source.

21 Claims, 13 Drawing Sheets

(51) Int. Cl.
*H02M 3/158* (2006.01)
*H02J 5/00* (2016.01)
*B60L 3/00* (2006.01)
*B60L 3/04* (2006.01)
*B60L 11/18* (2006.01)
*H02J 7/02* (2016.01)
*H02M 1/00* (2006.01)

(52) U.S. Cl.
CPC ............ *Y02T 10/7088* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y10T 307/50* (2015.04); *Y10T 307/713* (2015.04)

(56) References Cited

U.S. PATENT DOCUMENTS

| | | |
|---|---|---|
| 2009/0284220 A1 | 11/2009 | Toncich et al. |
| 2010/0033021 A1 | 2/2010 | Bennett |
| 2010/0033023 A1* | 2/2010 | Baarman .................... A61L 2/10 307/104 |
| 2011/0046438 A1 | 2/2011 | Iwaisako |
| 2011/0127953 A1 | 6/2011 | Walley et al. |
| 2012/0019074 A1 | 1/2012 | Frolov et al. |
| 2012/0043826 A1* | 2/2012 | Saitoh ........................ 307/104 |
| 2012/0048325 A1* | 3/2012 | Matsuo et al. ................ 136/244 |
| 2012/0161530 A1 | 6/2012 | Urano |
| 2013/0002036 A1 | 1/2013 | Kamata |
| 2013/0003299 A1* | 1/2013 | Wissner et al. ............... 361/695 |
| 2013/0009475 A1* | 1/2013 | Nunoya .................. H02J 5/005 307/43 |

OTHER PUBLICATIONS

Mdawala U.K., et al., "Modular-based inductive power transfer system for high-power applications," IET Power Electronics, 2012, vol. 5, Issue. 7, pp. 1119-1126.

* cited by examiner

MODULAR INDUCTIVE POWER TRANSFER POWER SUPPLY AND METHOD OF OPERATION

FIELD

The present disclosure relates generally to wireless power transfer, and more specifically to devices, systems, and methods related to wireless power transfer to remote systems such as vehicles including batteries. More specifically, the present disclosure relates to a power supply topology.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, there is a need for systems and methods that efficiently and safely transfer wireless power.

SUMMARY

Wireless power systems operate at relatively high-frequencies and high-power levels as compared to typical wired, line-frequency power systems. As a result, the components used in the construction of a wireless power supply, or transmitter, are subject to high levels of stress. One such component is the switch used in an inverter stage of a transmitter. Many wireless power transmitters use IGBTs as switches in the construction of the inverter stage of the supply, though MOSFETs may be used. IGBTs are often selected due to their ability to operate in high-current, high-voltage, high-frequency applications. Despite significant cost, the device ratings of modern high-performance IGBTs remain a limiting factor in wireless power transfer applications. In addition, switching multiple parallel IGBTs in each leg of an inverter proves difficult and soft-switching topologies alter the impedance of the load as seen by the supply. Moreover, should a component in traditional supply designs fail, wireless power transfer ceases. As such, the present disclosure relates to a power supply topology that may be used in a wireless power transmitter and that allows the paralleling of multiple modules, each subject to reduced load, while maintaining the tuning and performance and increasing the robustness of a wireless power transmitter.

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmitter comprising a conductive structure configured to generate a field and a plurality of electrical circuits operatively connected to the conductive structure and driven by a plurality of sources to provide the conductive structure with a substantially constant current.

Another aspect of the disclosure provides a method of wirelessly transmitting power comprising providing a substantially constant current in a conductive structure via a plurality of sources, generating a magnetic field via the conductive structure, and operatively disconnecting at least one source of the plurality of sources from the conductive structure.

Yet another aspect of the disclosure provides a wireless power transmitter comprising means for providing power, means for generating a magnetic field, and means for connecting the means for providing power to the means for generating a magnetic field, the means for connecting comprising means for tuning the transmitter to a resonant frequency, the means for connecting further comprising means for providing a substantially constant current in the means for generating the magnetic field.

Figure 1:
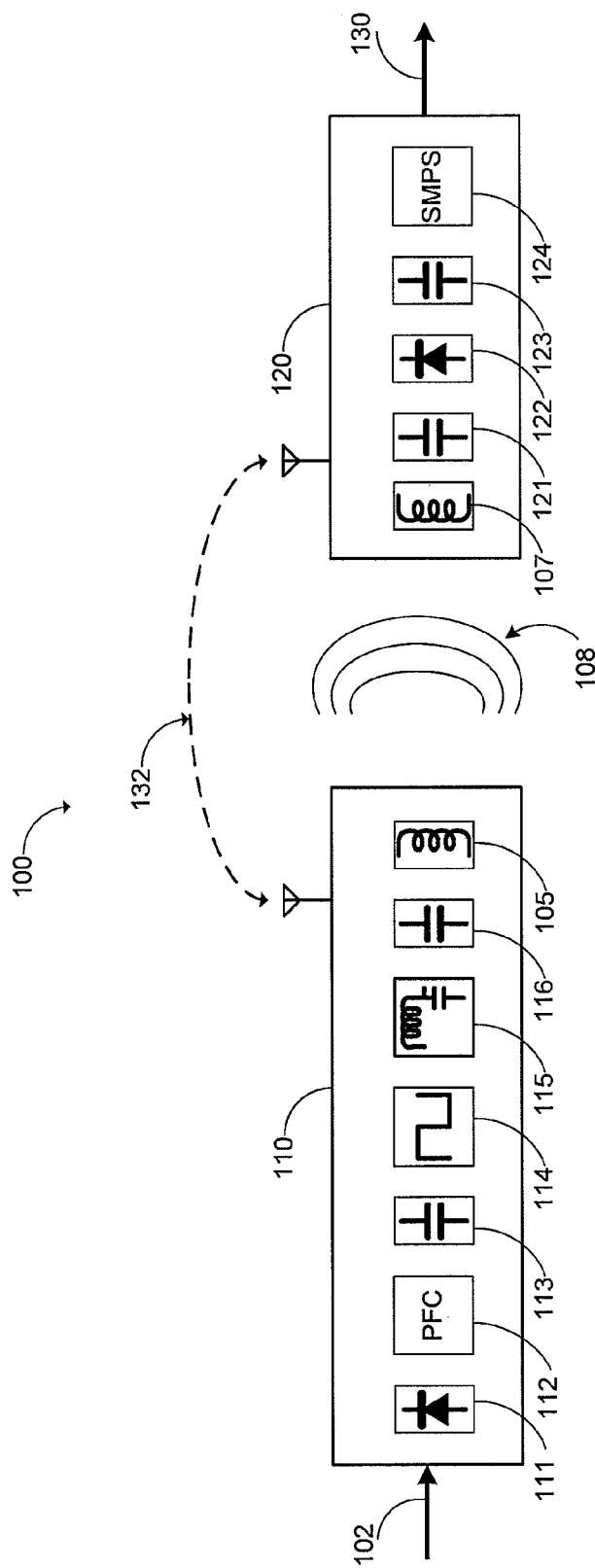
FIG. 1 is a functional block diagram of an exemplary wireless power transfer system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100. Input power 102 is provided to a wireless power transmitter 110, which converts the input power 102 to a form appropriate to drive a transmit circuit which generates a field 108 for providing energy transfer. Transmit circuit may include a conductive structure 105 and capacitor 116. The conductive structure 105 may generate a time varying magnetic field 108. A receive circuit may include a conductive structure 107 and capacitor 121. The conductive structure 107 couples to the conductive structure 105 via energy of the magnetic field 108 to induce a voltage, which is rectified and filtered by a wireless power receiver 120. The term "conductive structure" as used herein may be a loop, coil, antenna, or other structure. A conductive structure associated with a transmitter generates a magnetic field for wirelessly conveying energy to a conductive structure associated with a receiver. Conversely, a conductive structure associated with a receiver receives energy from a magnetic field generated by a conductive structure associated with a conductive structure associated with a wireless power transmitter. The resulting output may be used for storing or consumption by a device (not shown) coupled to the output power 130. Both the conductive structure 105 and the conductive structure 107 are separated by a distance. The conductive structure 105 and conductive structure 107 are tuned to resonate at an operating frequency of the system to optimize the efficiency of power transfer. When the resonant frequency of conductive structure 107 and the resonant frequency of conductive structure 105 are very close, transmission losses between the conductive structure 105 and the conductive structure 107 are minimal when the conductive structure 107 is located in the region where the majority of the flux lines of the magnetic field 108 pass near or through the conductive structure 107.

The conductive structure 105 and conductive structure 107 may be sized according to applications and devices to be associated therewith. Efficient energy transfer occurs by coupling a large portion of the energy of the field of the conductive structure 105 to a conductive structure 107 rather than propagating most of the energy in an electromagnetic wave to the far field. When in this near field, a coupling mode may be developed between the conductive structure 105 and the conductive structure 107. The area around the conductive structure 105 and conductive structure 107 where this near field coupling may occur may be referred to herein as a coupling mode region.

As shown in FIG. 1, the wireless power transmitter 110 may receive utility power at 50/60 Hz 102 and convert it to an alternating current (AC) at an operating frequency to drive the conductive structure 105. The wireless power transmitter 110 may include a rectifier 111 that converts the utility AC power into pulsating DC. For large loads, such as an electric vehicle charger, power factor correction circuitry 112 may be used to avoid excessive currents flowing in the utility grid and to filter the utility power at 50/60 Hz 102. The pulsating DC may be filtered by a large energy storage element 113 into a constant DC. The DC may then be converted to a square wave by an inverter circuit 114 and filtered into a sine wave by filter 115. This output may be then connected to a conductive structure 105 of a transmit circuit. The AC current flowing in the conductive structure 105 may create a time varying magnetic field 108. As stated, the transmit circuit may include conductive structure 105 and capacitor 116 to resonate at the frequency of operation, producing improved magnetic coupling between the conductive structure 105 and the conductive structure 107.

A conductive structure 107 in a receive circuit couples to the conductive structure 105 via magnetic field 108 and generates an AC power, which is connected to a wireless power receiver 120. The capacitor 121 and conductive structure 107 may form a resonant circuit at the frequency of operation, producing better magnetic coupling between the conductive structure 105 and the conductive structure 107. The AC power is converted to pulsating DC by rectifier 122. An energy storage device 123 may be included to smooth the pulsating DC into constant DC. A switch mode power supply 124 may be included to adjust the voltage to a value appropriate for charging a battery (not shown) via the output power 130. The wireless power transmitter 110 and wireless power receiver 120 may communicate by modulating the magnetic field 108, or on a separate communication channel 132 (e.g., Bluetooth, ZigBee, cellular, NFC, etc.).

As stated, efficient transfer of energy between the conductive structure 105 and conductive structure 107 occurs during matched or nearly matched resonance between the conductive structure 105 and the conductive structure 107 and are driven at that frequency by the wireless power transmitter 110. However, even when resonance between the conductive structure 105 and conductive structure 107 are not matched, energy may be transferred, although the efficiency may be affected. Transfer of energy occurs by coupling energy from the near field of the conductive structure 105 to the conductive structure 107 residing in the neighborhood where this near field is established rather than propagating the energy from the conductive structure 105 into free space. The near-field may correspond to a region in which there are strong reactive fields resulting from the currents and charges in the conductive structure 105 that do not radiate power away from the conductive structure 105. In some cases, the near-field may correspond to a region that is within about one $\frac{1}{2}\pi$ wavelength of the conductive structure 105 (and vice versa for the conductive structure 107) as will be further described below.

Figure 2:
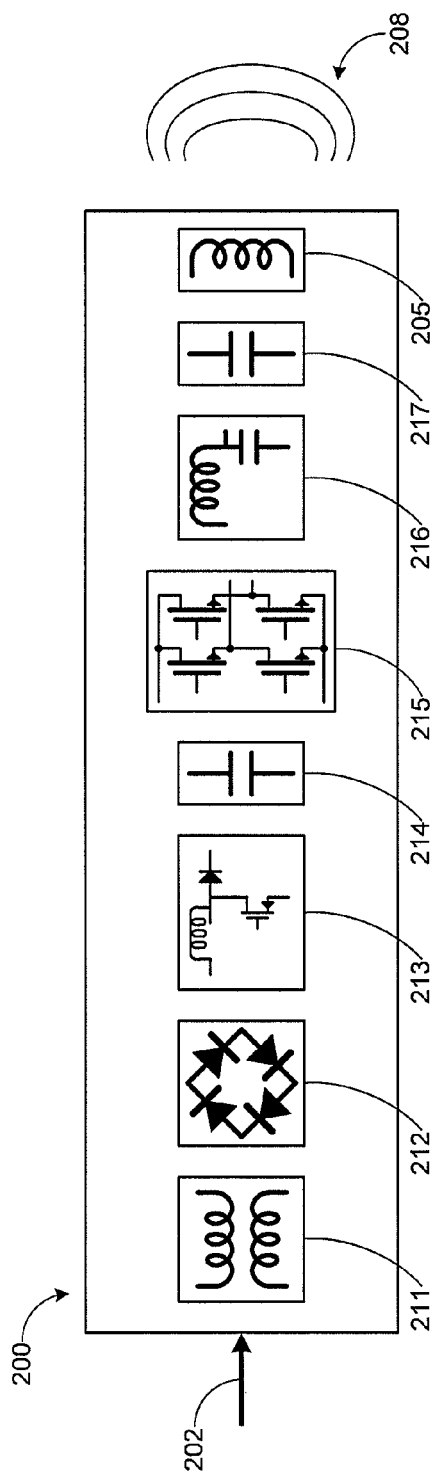
FIG. 2 is a functional block diagram of an exemplary wireless power transmitter that may be used in the wireless power transfer system of FIG. 1.

FIG. 2 is a functional block diagram of an exemplary wireless power transmitter 200 that may be used in the wireless power transfer system 100 of FIG. 1. FIG. 2 shows an exemplary configuration of a wireless power transmitter that may include functionality required to convert 50/60 Hz utility grid power into an AC that may be used to drive the transmit circuit including a conductive structure 205 and a capacitor 217, while other configurations are possible for other input power sources. 50/60 Hz utility grid power 202 may be conditioned by a line filter 211 to remove noise and damaging voltage spikes. A rectifier 212 may convert the 50/60 Hz AC to pulsating DC.

An active power factor correction circuit 213 may be included for regulatory purposes to avoid excess currents in the utility grid due to out of phase voltage and current and harmonic distortion due to the switching action of the rectifier 212. The active power factor correction circuit 213 may regulate its voltage output to be substantially constant. The power factor correction circuit 213 may regulate the flow of current from the utility grid so that it follows the utility grid voltage and appears as a resistive load with good power factor. The power factor correction circuit 213 may be similar to a switch mode power supply that draws current from the utility grid in a series of pulses that are modulated to match the utility grid voltage waveform.

An energy storage element 214 may be included and may be a very large capacitor or it may be composed of inductors and capacitors. In either case, the components may be large in order to store enough energy to last one half cycle of the 50/60 Hz utility grid power. Lower powered power supplies may omit the energy storage element 214, but the resulting AC power that drives the transmit circuit may then have a waveform of the rectified 50/60 Hz utility grid power superimposed as an envelope, leading to higher peak voltages and currents and higher peak magnetic fields. It may be desirable to avoid this at various power levels.

An inverter circuit 215 may be used to convert the rectified and smoothed DC produced by the previous components 211 to 214 and may chop the smoothed DC into a square wave at the frequency of operation of the transmit circuit. As an exemplary implementation, this frequency could be at 20 KHz, though any frequency could be used that leads to practical sized transmit circuit and receive circuit. Higher frequencies may allow smaller components to be used in the wireless power transmitter 200, while lower frequencies may lead to higher efficiency due to lower switching losses. Charging systems have been proposed to use frequencies in the range from 400 Hz to 1 MHz.

A matching circuit 216 may be included to perform dual duty as a filter to convert the square wave generated by inverter circuit 215 to a sine wave with suppressed harmonics and matches the impedance of the inverter circuit 215 to the resonant circuit made up of capacitor 217 and the conductive structure 205 of the transmit circuit. Since the matching circuit 216 is operating at a relatively high frequency, the components may be relatively small, but are preferably of high quality to avoid losses. Capacitor 217 may be in parallel with or series with the conductive structure 205 in the transmit circuit, but in any case may be of the highest quality to avoid loss as the current flowing in this device is multiplied by the operating Q of the resonant circuit. Similarly, the conductive structure 205 in the transmit circuit may be composed of high quality components to avoid loss. Litz wire may be used to increase surface area and make maximum use of the copper in the winding. Alternately the conductive structure 205 of the transmit circuit may be made of a metallic strip with the thickness, width and metal type selected to keep resistive losses low. Ferrite material used for the magnetic circuit may be selected to avoid saturation, eddy currents and loss at the frequency of operation.

The wireless power transmitter 200 may further include a load sensing circuit (not shown) for detecting the presence or absence of active receive coils in the vicinity of the magnetic field 208 generated by the transmit circuit. By way of example, a load sensing circuit monitors the current flowing to the inverter circuit 215, which is affected by the presence or absence of a properly aligned receive coil in the vicinity of the magnetic field 208. Detection of changes to the loading on the inverter circuit 215 may be monitored by a controller, not shown, for use in determining whether to enable the power factor correction circuit 213 for transmitting energy and to communicate with an active receive coil. A current measured at inverter circuit 215 may be further used to determine whether an invalid object is positioned within a charging region of transmit circuit.

Figure 3:
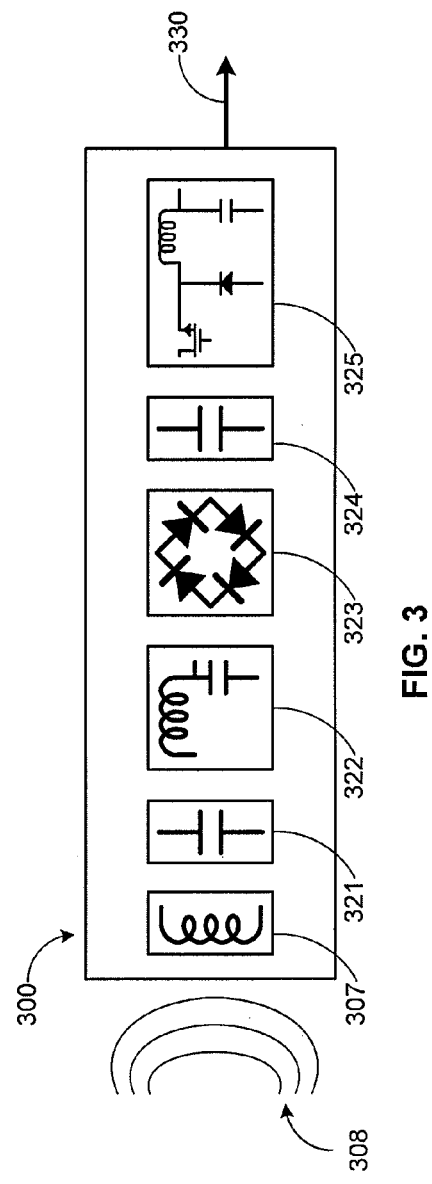
FIG. 3 is a functional block diagram of an exemplary wireless power receiver that may be used in the wireless power transfer system of FIG. 1.

FIG. 3 is a functional block diagram of an exemplary wireless power receiver system 300 that may be used in the wireless power transfer system 100 of FIG. 1. The receiver system 300 may convert the magnetic field 308 into an AC power that is converted to DC power 330 used to charge a battery (not shown) or power a device (not shown). The receive circuit includes an conductive structure 307 that together with capacitor 321 forms a resonant circuit. The comments of component quality for conductive structure 307 and capacitor 321 described above with reference to FIG. 2 apply here also. A matching circuit 322 may perform a similar function to matching circuit 213 only in reverse where the AC power generated by the receive circuit is impedance matched to a rectifier 323 and the harmonics generated by the rectifier 323 are not coupled to the receive circuit. The rectifier circuit 323 may be used to reduce the harmonics generated by the rectifying action and reduce the filtering requirements on the matching circuit 322. This may allow for providing a high power factor to increase the efficiency of power conversion to wirelessly receive power and provide that power to a load (e.g., a battery for charging).

An energy storage element 324 may be used to smooth pulsating DC into constant DC. The energy storage element 324 may operate at high frequencies (as compared to the energy storage element 214 of FIG. 2) so components may be smaller. A switch mode power supply 325 may be used to regulate the DC voltage and possibly the DC current in response to a battery management system (not shown). As an alternative, the regulating function of the switch mode power supply 325 may be provided within at the wireless power transmitter 200, but this approach may depend on a fast and reliable communications link from the wireless power receiver 300 to the wireless power transmitter 200 and may add complexity to the whole system.

Figure 4:
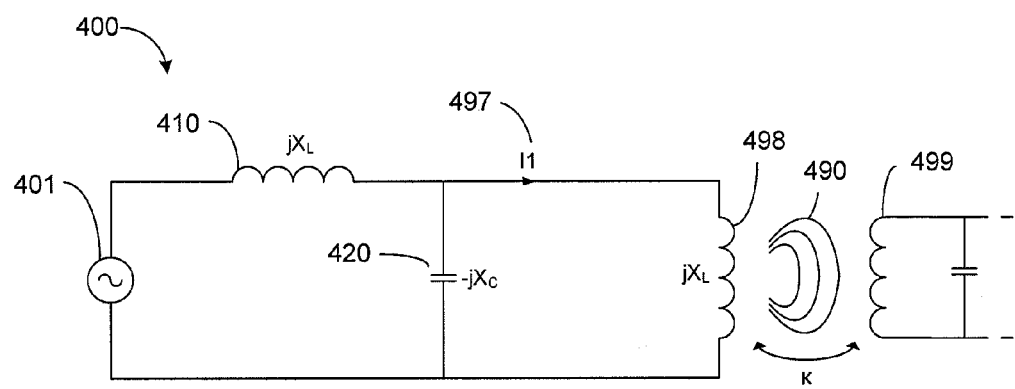
FIG. 4 is a simplified circuit schematic of a wireless power transmitter with an LCL resonant circuit load.

FIG. 4 is a simplified circuit schematic of a wireless power transmitter with an LCL resonant circuit load. As shown, the conductive structure 498 generates the magnetic field 490 to inductively couple to the conductive structure 499 for power transfer. On the transmit side, the conductive structure 498 is one of the inductors in the LCL resonant circuit load which is powered by source 401. Source 401 is representative of circuitry prior to the LCL resonant circuit load, for example utility grid power 202, line filter 211, rectifier 212, power factor correction circuit 213, energy storage element 214, and inverter circuit 215 of FIG. 2, or some subset thereof. On the receive side, the conductive structure 499 may be conductive structure 307 of FIG. 3 (e.g., part of receive circuit). Further, the conductive structure 499 may be connected to capacitor 321, matching circuit 322, rectifier 323, energy storage element 324, switch mode power supply 325 of FIG. 3, to provide DC power 330. Conductive structures 498 and 499 may be thought of as primary and secondary coils, respectively, of a loosely coupled transformer.

The LCL resonant circuit load, comprising inductor 410, capacitor 420, and conductive structure 498, has multiple functions. First, like matching circuit 216 of FIG. 2, the LCL resonant circuit load may smooth the output of the source. An inverter circuit converts the DC output of a rectifier into an AC signal. This AC signal may include frequency components other than the operating frequency of the wireless power system and have non-sinusoidal waveform (e.g., a square wave). However, it may be desirable to have a sinusoidal input to the transmit coil at the operating frequency of the system for energy transfer. Thus, the LCL resonant circuit load may filter non-operating frequency components output from the inverter circuit, resulting in a sinusoidal excitation signal for the resonant circuit. Second, conductive structure 498 and capacitor 420 serve as the transmit circuit (e.g., a conductive structure 205 and capacitor 217 in FIG. 2). Thus, a portion of the LCL resonant circuit serves as the transmit coil for wireless power transfer, reducing system complexity as compared systems implementing other matching circuits between a power source and resonant coil. The resonant frequency of the system, or tuning of the wireless power transmitter, is thus set by the inductance L of conductive structure 498 and capacitance C of capacitor 420. Finally, the LCL resonant circuit load as coupled to a receive side load performs an impedance transformation such that the impedance as seen by the source allows for efficient energy transfer. More specifically, with the capacitor 420 having reactance $X_C$ and inductor 410 and conductive structure 498 each having an inductive reactance $X_L$, and where $X_C$ equals $X_L$, it can be shown that the impedance as seen by the source is the reflected impedance of the receive side load via the inductive coupling between conductive structures 498 and 499. Thus, variations in the receive side load are reflected to the source and losses in the matching network are minimized. In some embodiments, the conductive structure may include a single loop, coil, or antenna having reactance $X_L$. In other embodiments, the conductive structure may include a plurality of loops, coils, or antenna in electrical configuration such that the equivalent reactance is $X_L$. The plurality of loops, coils, or antenna may be relatively located in space to adjust the generated magnetic field.

As discussed above, device ratings of components used in power supply design often limit high-power, high-voltage, high-frequency wireless power transfer applications. Accordingly, the present disclosure relates to a power supply topology that may be used in a wireless power transmitter and that allows the paralleling of multiple modules, each subject to reduced load, while maintaining the tuning and performance and increasing the robustness of the transmitter.

Figure 5A:
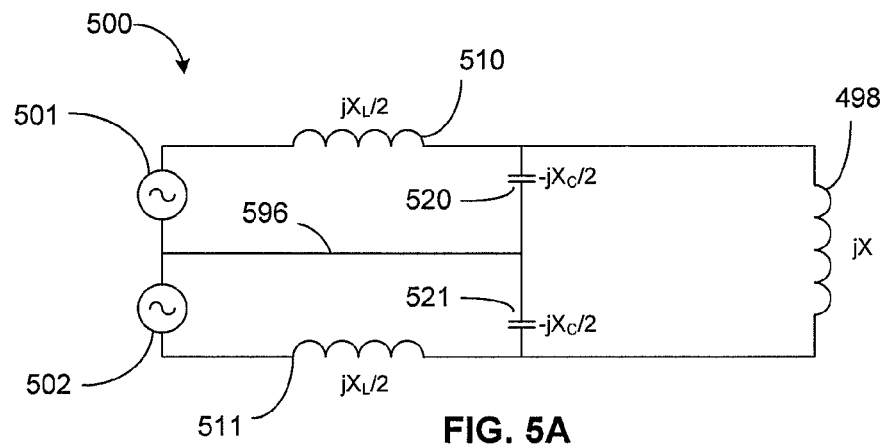
FIG. 5A is a simplified circuit schematic of an exemplary wireless power transmitter.

FIG. 5A shows simplified circuit schematic of an exemplary wireless power transmitter. As can be seen, the tuning capacitor 420 has been split into series capacitors 520 and 521, each having a reactance of ½$X_C$, without affecting the resonant frequency of the system. In doing so, the left-half of the tuning circuit can be split into two sources, 501 and 502, sharing a common center tap 596. To maintain matching, inductor 410 is split into two inductors, 510 and 511, each having a reactance determined by the associated capacitor, in this case, ½$X_L$. In this manner, tuning and matching of the circuit is maintained, while lowering the power output from each source.

Because sources 501 and 502 both drive conductive structure 498, it is desirable to synchronize their outputs. Otherwise, losses may arise as the sources drive against each other. For example, in a worst case scenario, if the output waveforms of the sources are 180° out of phase, the two sources will cancel, effectively negating any power transfer to a receiver. Thus, synchronization mitigates power loss in the wireless power transmitter. So long as the sources are synchronized, the total power output of the wireless power transmitter may, but need not, be evenly divided among the sources. For example, source 501 may output 40 kW while source 502 may output 20 kW, for a total wireless power transmitter power output of 60 kW.

Figure 5B:
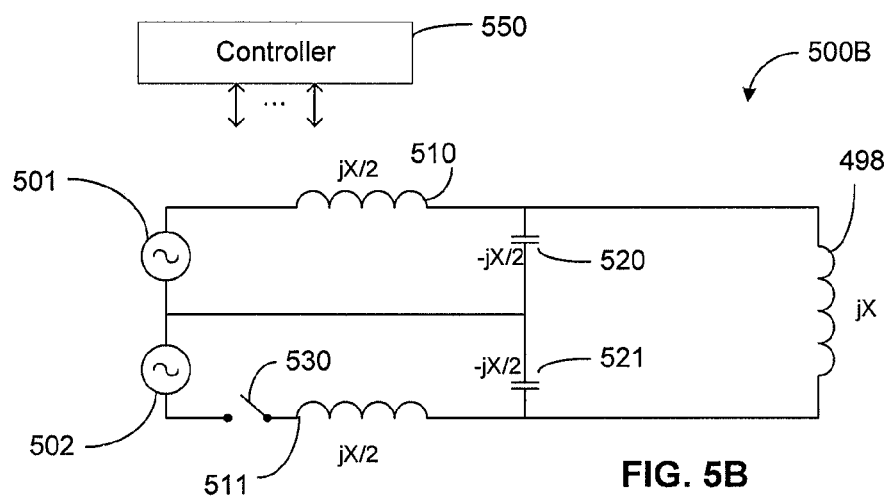
FIG. 5B is a simplified circuit schematic of the wireless power transmitter in FIG. 5A with a portion of the circuit disconnected.

FIG. 5B is a simplified circuit schematic of the wireless power transmitter in FIG. 5A with a portion of the circuit disconnected. Notably, the transmitter continues to operate in such an event. Before switch 530 transitions into the open state, sources 501 and 502 are energizing capacitors 520 and 521, respectively. That energy is in turn used to drive current through conductive structure 498 for generation of magnetic field 490. Thus, with ideal components, the total power that may be transmitted by the transmitter is thus the sum of the power output from the two sources (non-ideal components would reduce total power output by any resistive and radiative losses.) When switch 530 transitions to an open state, source 502 and inductor 511 are effectively removed from the transmitter. The transmitter will temporarily experience transients due to the transition of the switch state. Once the system reaches a steady state, and assuming the transmitter is unloaded, it can be shown that the current through conductive structure 498 remains substantially constant despite removal of one of source 502. This is because the resonant frequency of the transmitter remains unchanged with the opening of the switch, as set by the conductive structure 498 and capacitors 520 and 521. The source 501 provides sufficient power to compensate for any power loss in the resonant transmit coil. However, should a receive side load be introduced, the total power output of the system will be limited by the power output of source 501 (e.g., 40 kW above).

Switch 511 may be any type of switch including mechanical, electrical, or electromechanical switch types. While only one switch is depicted, another switch may be included to isolate source 501. A controller 550 may be included to control the one or more switches included in the system, in addition to performing any other functions requiring processing (e.g., adaptive tuning, out-of-band communication, object-detection, power output control.) Controller 550 may gather one or more parameters in determining whether to open or close switch 511. Some parameters may be measured via sensors included in the system (e.g., voltage, current, temperature) or determined based on measurements (e.g., changes in load). Other parameters may include information received from a higher-level controller or from a wireless power receiver located nearby. Certain events may be determined and the switch state adjusted accordingly. For example, if there is a component failure, the switch may be used to isolate the faulty half of the system. As another example, if the controller determines an increase in power is desirable, it may switch in a disconnected but operational source.

Figure 6:
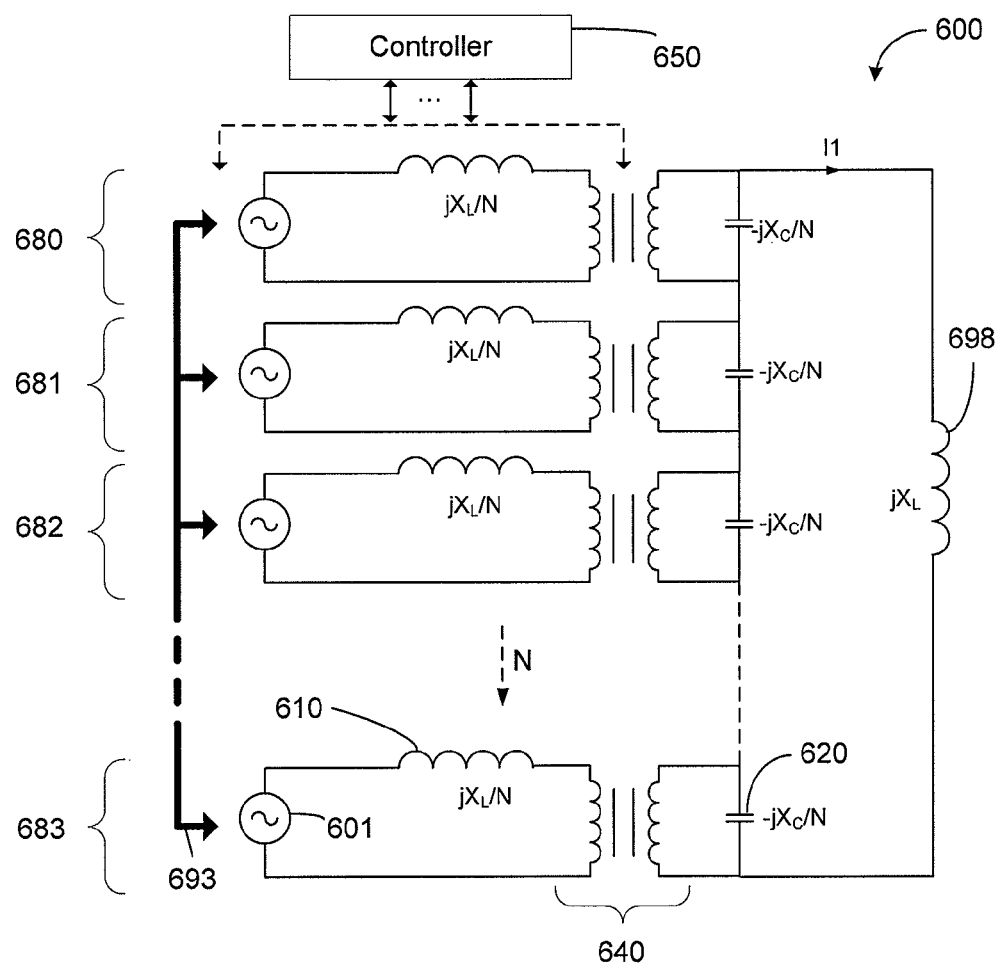
FIG. 6 is a simplified circuit schematic of an exemplary wireless power transmitter, including transformers to isolate modular supplies.

FIG. 6 is a simplified circuit schematic of an exemplary wireless power transmitter, including transformers to isolate modular supplies. A module may include any number of components in wireless power transmitter 200 from the line filter 211 up to but excluding the capacitor in the resonant circuit (so that tuning is maintained). Module 683 includes source 601, inductor 610, and transformer 640 to couple the output of the source to capacitor 620. In this configuration, any number of modules 680, 681, 682, and 683, may drive conductive structure 698 in parallel. Thus, lower-cost components may be operated further from their operating limits, reducing overall cost and increasing reliability. Assuming N modules in a particular wireless power transmitter, the reactance of the capacitors (e.g., capacitor 620) used to tune the resonant coil is divided by N, each capacitor connected to a secondary coil of a transformer. Similarly, the reactance of the inductors (e.g., inductor 610) coupling the sources to the primary coil of the transformer is divided by N. The transmitter remains tuned and the power output of each module is reduced. Again, should one or more sources be disconnected from the transmit circuit, the resonant frequency remains unchanged, the current through conductive structure 698 remains substantially constant, and there is a proportional reduction in the total power that can be output from the transmitter. Again, controller 650 may be used to selectively disconnect any number of sources from the transmit coil via switch.

While a module may include any number of components up to the capacitor used to tune the resonant circuit, use of the transformer provides another advantage. Because the transformers electrically isolate the output of each of the sources, the sources may be powered by a common DC bus 693. For example, an output of energy storage element 214 may be used to power a plurality of inverter circuits 215 acting as sources for each of the N modules. The DC voltage may be lowered and current levels increased to limit the voltage that develops across the conductive structure 698.

Figure 7:
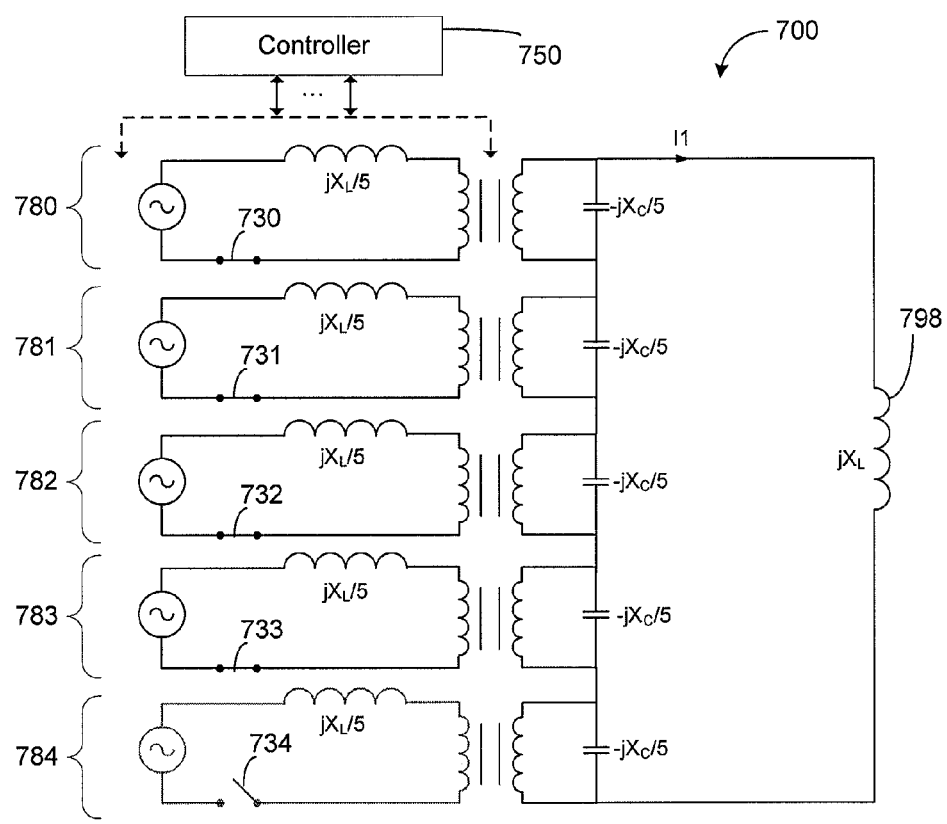
FIG. 7 is a simplified circuit schematic of an exemplary wireless power transmitter, having redundant modules.

FIG. 7 is a simplified circuit schematic of an exemplary wireless power transmitter, having redundant modules. To improve the robustness of a wireless power transmitter in light of component limitations, a backup module may be included in a wireless power transmitter. Here, the wireless power transmitter includes five modules. Four of the modules are operated at any given time to supply the maximum power output of the system (as set by regulatory limits or other considerations.) In this case, modules 780-783 are active and module 784 serves as a backup module. In the event controller 750 detects a fault with, for example, module 782, the controller 750 may disconnect module 782 via switch 732 and connect module 784 via switch 734. Thus, reliability of the wireless power transmitter is improved.

Figure 8:
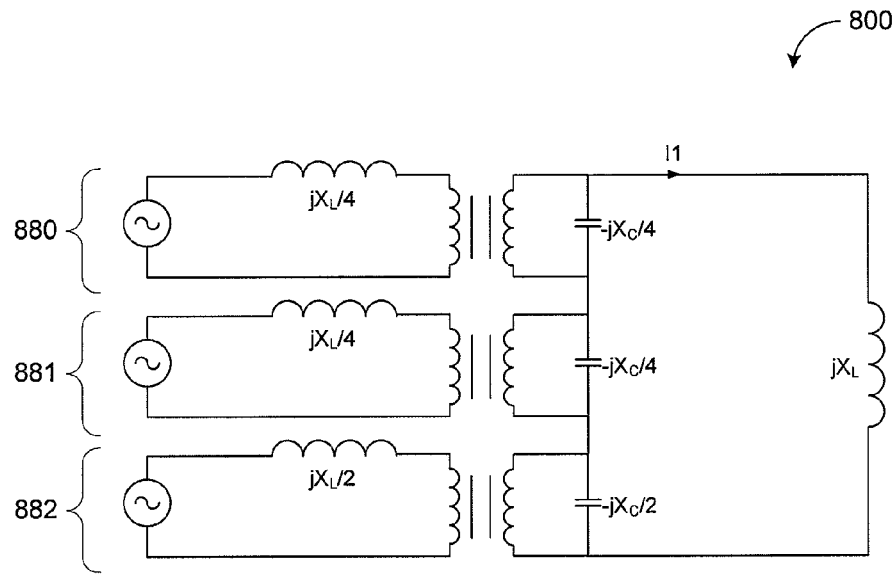
FIG. 8 is a simplified circuit schematic of an exemplary wireless power transmitter, demonstrating unequal distribution across modules.

FIG. 8 is a simplified circuit schematic of an exemplary wireless power transmitter, demonstrating unequal power distribution amongst modules. As shown, the load as seen by each module may not be evenly distributed. This may be desirable for scalable transmitter design based on application requirements. Here, modules 880 and 881 may each supply one quarter of the total power output, while module 882 supplies one half.

Figure 9:
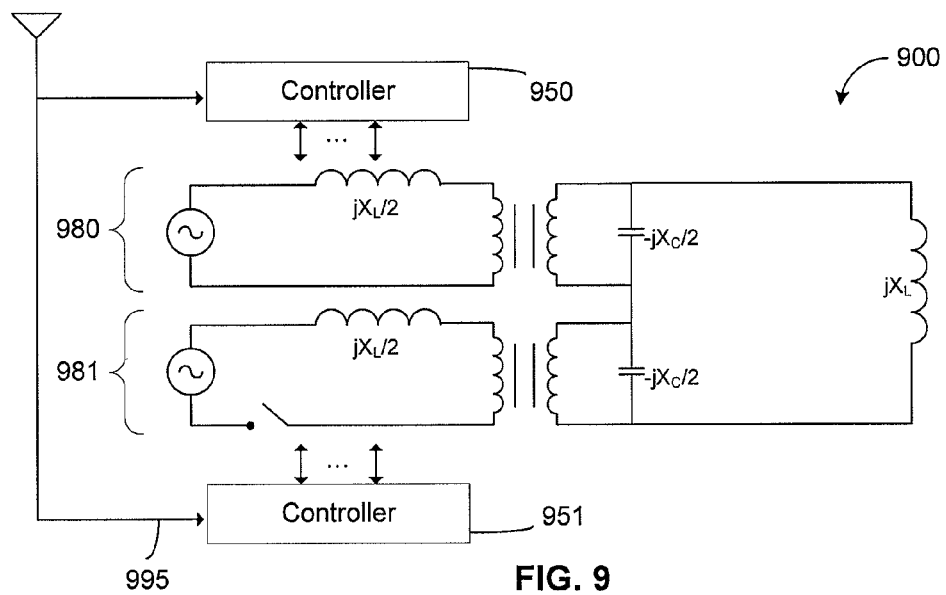
FIG. 9 is a simplified circuit schematic of an exemplary wireless power transmitter, showing an alternative controller arrangement.

FIG. 9 is a simplified circuit schematic of an exemplary wireless power transmitter, showing an alternative controller arrangement. In certain applications, modules 980 may be physically distant from module 981. Thus, controllers 950 and 951 may monitor modules 980 and 981, respectively. In addition, a controller may be disposed within a module such that a controller may be removed with a module, or a controller may remain when a module is removed. Controllers may communicate amongst each other over a communication channel 995 or to other devices (not shown). Communications may include diagnostic, maintenance, status, or other information. When multiple modules are present, the controllers may communicate to selectively enable modules to power the transmit circuit. For example, if the wireless power receiver load increases, a disabled controller may receive a signal indicating that module should be connected to the transmit circuit. In another example, a controller than detects a fault in its module may send a signal to another controller to connect a backup module or a disconnected, operational module.

Figure 10:
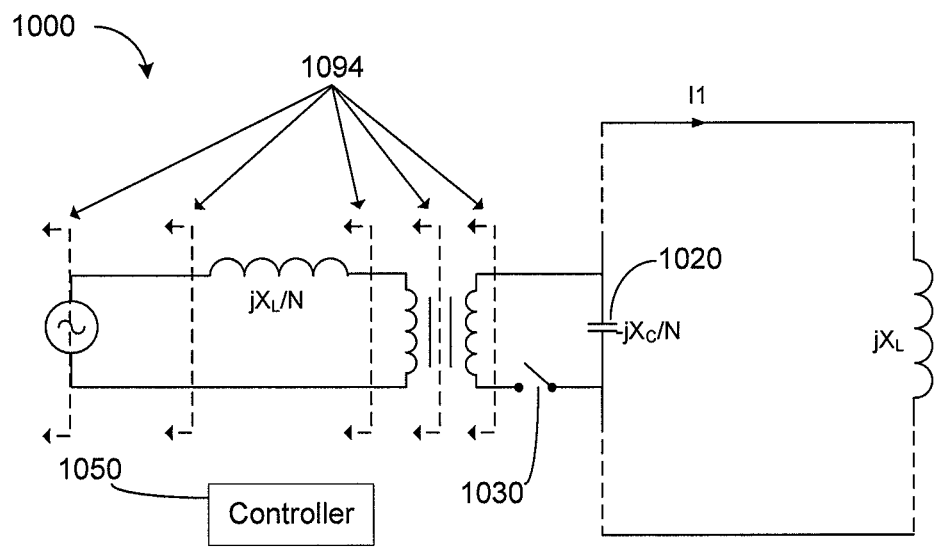
FIG. 10 is a simplified circuit schematic of an exemplary wireless power transmitter, indicating exemplary disconnect points.

FIG. 10 is a simplified circuit schematic of an exemplary wireless power transmitter, indicating exemplary disconnect points. The modular design of the wireless power transmitter enables the hot-swapping of modules. As previously mentioned, a module may include any components left of the tuning capacitor (e.g., capacitor 1020) used to set the resonant frequency of the transmitter. Further, one or more switches may be included in the transmitter to disconnect the module from the resonant circuit, here switch 1030 is located between the secondary coil of the transformer and the tuning capacitor. Disconnect points 1094 are exemplary locations where a module may be disconnected and, optionally, physically removed from the transmitter. Thus, maintenance may be carried out on a transmitter without impacting the ability of operational modules from powering the resonant circuit.

One example application of the power supply topology described above is in wireless power transmitters for the deployment of electric vehicle systems. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, conveyer devices, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 11:
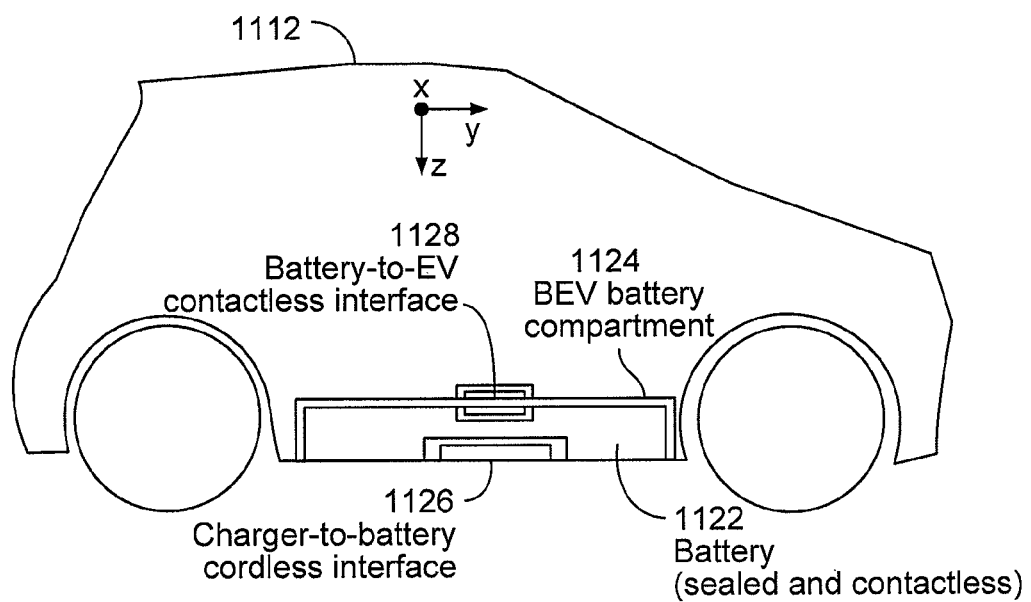
FIG. 11 is a functional block diagram showing a replaceable contactless battery disposed in an exemplary electric vehicle.

A wireless power transfer system may be used with a variety of electric vehicles including rechargeable or replaceable batteries. FIG. 11 is an exemplary functional block diagram showing a replaceable contactless battery disposed in an electric vehicle 1112. The low battery position may be useful for an electric vehicle battery unit that integrates a wireless power interface (e.g., a charger-tobattery cordless interface 1126) and that may receive power from a wireless power transmitter (not shown) below the vehicle or embedded in the ground. In FIG. 11, the electric vehicle battery unit may be a rechargeable battery unit, and may be accommodated in a battery compartment 1124. The electric vehicle battery unit also provides a wireless power interface 1126, which may integrate the entire electric vehicle wireless power receiver including a resonant conductive structure, power conversion circuitry, and other control and communications functions as needed for efficient and safe wireless energy transfer between a wireless power transmitter and the electric vehicle battery unit (See FIGS. 1 and 3). Note the wireless power transfer system as used in an electric vehicle application and incorporating the power supply topology disclosed herein may facilitate bidirectional power transfer, thus a conductive structure may act to either receive or transmit energy. This allows an EV owner to sell stored energy at times of high utility power demand (e.g., during the day) and purchase energy at times of low utility power demand (e.g., during the night).

It may be useful for the electric vehicle conductive structure to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power receiver. The electric vehicle battery unit 1122 may also include a battery-to-EV cordless interface 1122, and a charger-to-battery cordless interface 1126 that provides contactless power and communication between the electric vehicle 1112 and a wireless power transmitter.

Figure 12:
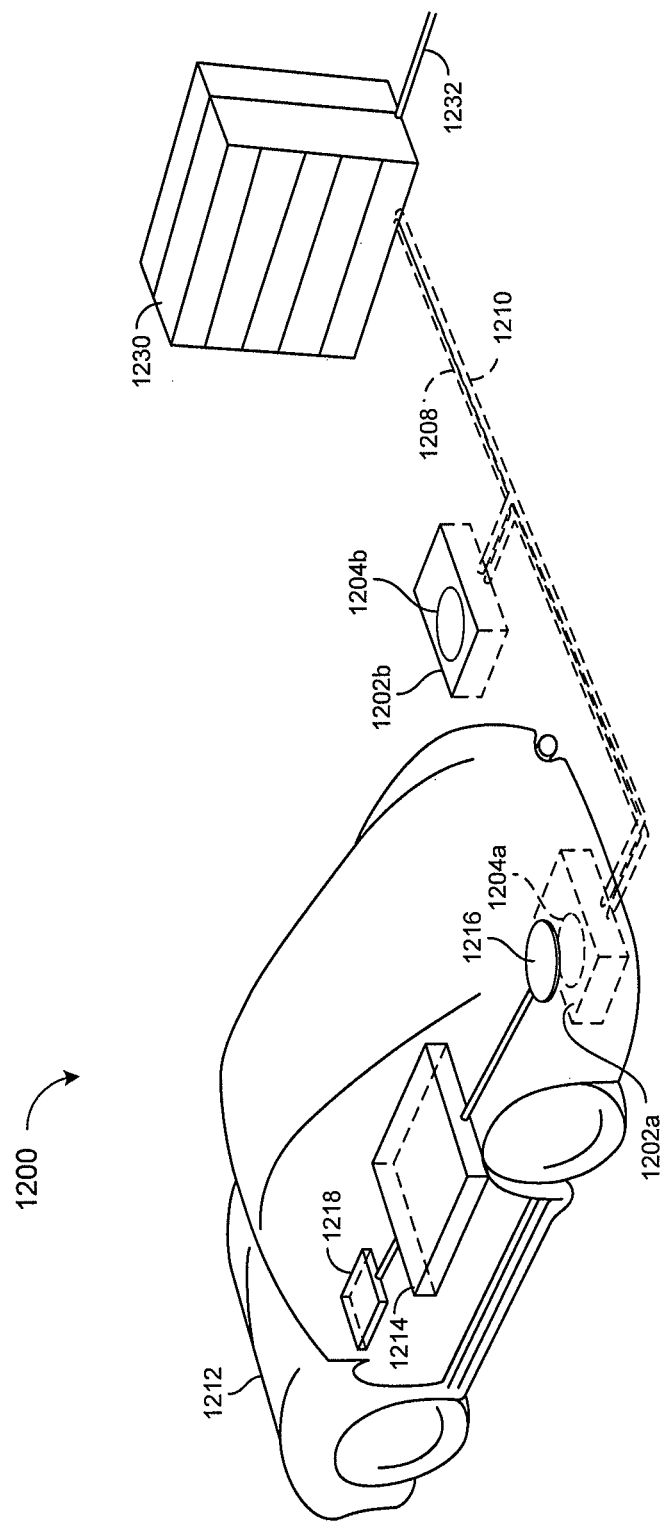
FIG. 12 is a diagram of an exemplary wireless power transfer system for charging an electric vehicle.

FIG. 12 is a diagram of an exemplary wireless power transfer system 1200 for charging an electric vehicle 1212. The wireless power transfer system 1200 enables charging of an electric vehicle 1212 while the electric vehicle 1212 is parked near a base 1202a. Spaces for two electric vehicles are illustrated in a parking area to be parked over corresponding base 1202a and 1202b. A distribution center 1230 may be connected to a power backbone 1232 and configured to provide an alternating current (AC) or a direct current (DC) supply through a power link 1210 to the base 1202a, depending on siting of the other components (e.g., line filter 211 and rectifier 212 of FIG. 2). The base 1202a also includes an conductive structure 1204a for wirelessly transferring or receiving power. An electric vehicle 1212 may include a battery unit 1218, an electric vehicle conductive structure 1216, and an electric vehicle wireless charging system 1214. The electric vehicle conductive structure 1216 may interact with the base conductive structure 1204a for example, via a region of the electromagnetic field generated by the base conductive structure 1204a.

The electric vehicle conductive structure 1216 may receive power when the electric vehicle conductive structure 1216 is located in an energy field produced by the base conductive structure 1204a. The field corresponds to a region where energy output by the base conductive structure 1204a may be captured by an electric vehicle conductive structure 1216. For example, the energy output by the base conductive structure 1204a may be at a level sufficient to charge or power the electric vehicle 1212. In some cases, the field may correspond to the "near field" of the base conductive structure 1204a. The near-field may correspond to a region in which there are strong reactive fields resulting from the currents and charges in the base conductive structure 1204a that do not radiate power away from the base conductive structure 1204a. In some cases the near-field may correspond to a region that is within about $\frac{1}{2}\pi$ of wavelength of the base conductive structure 1204a (and vice versa for the electric vehicle conductive structure 1216) as will be further described below.

Local distribution 1230 may be configured to communicate with external sources (e.g., a power grid) and with the base 1202a via one or more communication links (not shown).

The electric vehicle conductive structure 1216 may be aligned with the base conductive structure 1204a and, therefore, disposed within a near-field region simply by the driver positioning the electric vehicle 1212 correctly relative to the base conductive structure 1204a. To aid in alignment, the driver may be given visual feedback, auditory feedback, or combinations thereof to determine when the electric vehicle 1212 is properly placed for wireless power transfer. Alternatively, the electric vehicle 1212 may be positioned by an autopilot system, which may move the electric vehicle 1212 back and forth (e.g., in zig-zag movements) until an alignment error has reached a tolerable value. This may be performed automatically and autonomously by the electric vehicle 1212 without or with only minimal driver intervention provided that the electric vehicle 1212 is equipped with a servo steering wheel, ultrasonic sensors, and intelligence to adjust the vehicle. Alternatively, the electric vehicle conductive structure 1216, the base conductive structure 1204a, or a combination thereof may have functionality for displacing and moving the conductive structures 1216 and 1204a relative to each other to more accurately orient them and develop more efficient coupling therebetween.

The base 1202a may be located in a variety of locations. As non-limiting examples, some suitable locations include a parking area at a home of the EV owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 1200. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 1212 may be used as distributed storage devices to stabilize a power grid, a docking-to-grid solution may be used to increase availability of vehicles for Vehicle-to-Grid (V2G) operation.

A wireless power transfer system 1200 as described with reference to FIG. 12 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base 1202a transfers power to the electric vehicle 1212 and the electric vehicle 1212 transfers power to the base 1202a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

With continued reference to FIG. 12, the base conductive structure 1204a and the electric vehicle conductive structure 1216 may be in a fixed position and the conductive structures are brought within a near-field coupling region by overall placement of the electric vehicle conductive structure 1216 relative to the base 1202a. However, in order to perform energy transfer rapidly, efficiently, and safely, the distance between the base conductive structure 1204a and the electric vehicle conductive structure 1216 may need to be reduced to improve coupling. Thus, the base conductive structure 1204a and/or the electric vehicle conductive structure 1216 may be deployable and/or moveable to bring them into better alignment.

With continued reference to FIG. 12, the charging systems described above may be used in a variety of locations for charging an electric vehicle 1212, or transferring power back to a power grid. For example, the transfer of power may occur in a parking lot environment. It is noted that a "parking area" may also be referred to herein as a "parking space." To enhance the efficiency of a vehicle wireless power transfer system 1200, an electric vehicle 1212 may be aligned along an X direction and a Y direction to enable an electric vehicle conductive structure 1216 within the electric vehicle 1212 to be adequately aligned with a base 1202a within an associated parking area.

Furthermore, the disclosed embodiments are applicable to parking lots having one or more parking spaces or parking areas, wherein at least one parking space within a parking lot may comprise a base 1202a. Guidance systems (not shown) may be used to assist a vehicle operator in positioning an electric vehicle 1212 in a parking area to align an electric vehicle conductive structure 1216 within the electric vehicle 1212 with a base 1202a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 1212 to enable an conductive structure 1216 within the electric vehicle 1212 to be adequately aligned with a charging conductive structure within a charging base (e.g., base 1202a).

As discussed above, the electric vehicle charging system 1214 may be placed on the underside of the electric vehicle 1212 for transmitting and receiving power from a base 1202a. For example, an electric vehicle conductive structure 1216 may be integrated into the vehicles underbody preferably near a center position providing maximum safety distance in regards to EM exposure and permitting forward and reverse parking of the electric vehicle.

Figure 13:
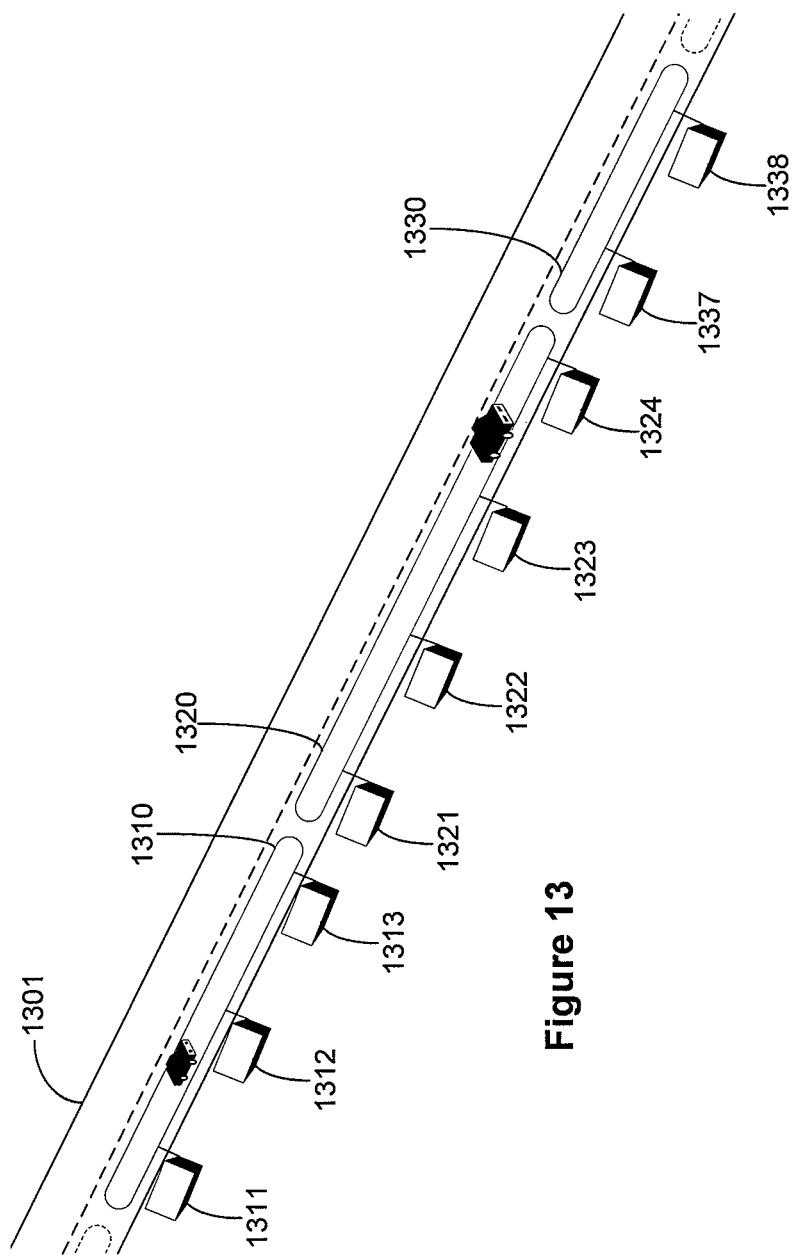
FIG. 13 is a diagram of an exemplary wireless power transfer system for powering electric vehicles along a roadway.

FIG. 13 is a diagram of an exemplary wireless power transfer system for powering electric vehicles along a roadway. Unlike a stationary EV context, discussed above, the power supply topology disclosed herein may be used in dynamic roadway applications where the power demand is subject to change as various electric vehicles traverse the length of a transmit coil. As shown, conductive structures 1310, 1320, and 1330 may be embedded within a track 1301, which may be a fixed track, a road, a highway, a surface street, a conveyer line, or other EV transit pathway. Depending on the track length, one or more modules may provide power to the track. For example, conductive structure 1310 is powered by three modules, 1311-1313, conductive structure 1320 is powered by four modules, 1321-1324, and conductive structure 1330 is powered by two modules, 1337-1338. Due to the physical dimensions of such an application, the modular design of the power supply topology discussed above facilitates physical separation of the modules along the track length. Further, as in FIG. 9, modules may communicate via a separate communications link (not shown.) Beyond communications among modules connected to a single transmit coil, modules may communicate amongst transmit coils to transfer information to down-track modules related to expected loading based on vehicle travel. In such an application, the reliability of the power supply topology allows electric vehicles to continue to traverse the track despite a module that may have been disconnected. Further, a controller disposed within a module may transmit a message to another device indicating the health of the system. For example, if one of the modules is disconnected, the entity responsible for managing the track may be notified of the need for maintenance (e.g., a public or private organization).

Figure 14:
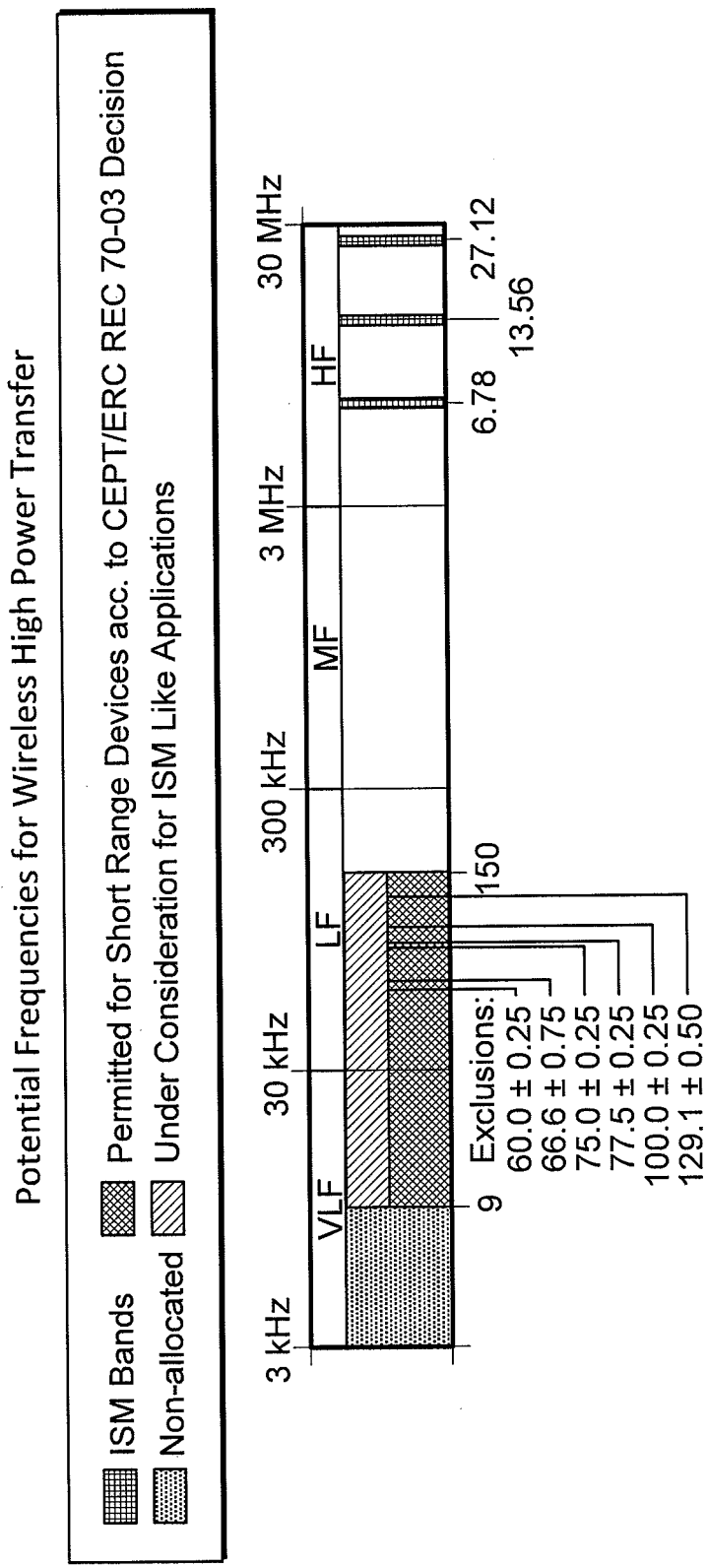
FIG. 14 is a chart of a frequency spectrum showing exemplary frequencies that may be available for wireless charging an electric vehicle.

FIG. 14 is a chart of a frequency spectrum showing exemplary frequencies that may be used for wireless charging an electric vehicle in a wireless power transfer system. As shown in FIG. 14, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 15:
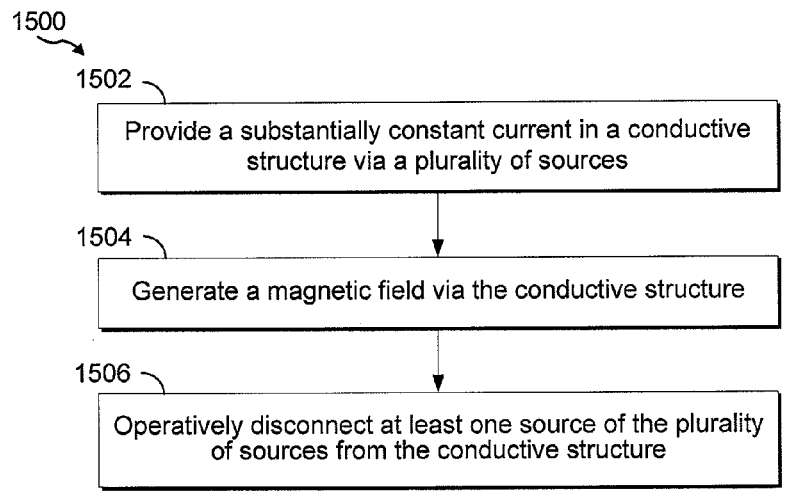
FIG. 15 is a flowchart of an exemplary method of wirelessly transmitting power.

FIG. 15 is a flowchart of an exemplary method 1500 of wirelessly transmitting power. The method 1500 may be used in conjunction with any of the systems described with reference to FIGS. 1-10, 12 and 13. At block 1502, a plurality of sources provide a substantially constant current in a conductive structure. At block 1504, the conductive structure generates a magnetic field. At block 1506, at least one source of the plurality of sources is operatively disconnected from the conductive structure. Further, should the at least one source of the plurality of sources be operatively disconnected from the conductive structure, the current through the conductive structure remains substantially constant.

Figure 16:
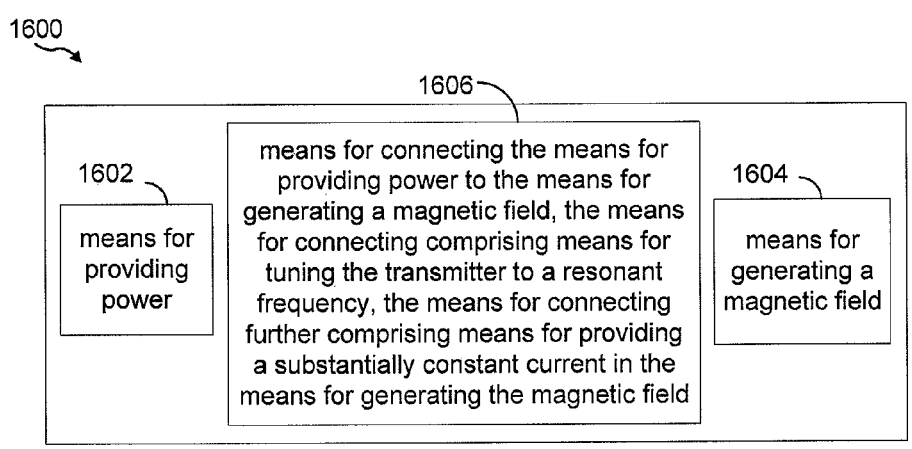
FIG. 16 is a functional block diagram of an exemplary wireless power transmitter.

FIG. 16 is a functional block diagram of an exemplary wireless power transmitter. Wireless power transmitter comprises means for providing power 1602, means for generating a magnetic field 1604, and means for connecting the means for providing power to the means for generating a magnetic field, the means for connecting comprising means for tuning the transmitter to a resonant frequency, the means for connecting further comprising means for providing a substantially constant current in the means for generating the magnetic field 1606. For example, means for providing power may comprise sources 401, 501, 502, or 601. As another example, means for providing power may comprise rectifier 111, power factor correction circuit 112, energy storage element 113, inverter circuit 114, and/or filter 115. As yet another example, means for providing power may comprise line filter 211, rectifier 212, power factor correction circuit 213, energy storage element 214, and/or inverter circuit 215. The means for generating a magnetic field may comprise, for example, conductive structures 498, 598, 698, or 798. Means for generating a magnetic field may alternatively comprise conductive structure 105 or 205. Finally, means for connecting may comprise inductor 410 and capacitor 420, inductors 510 and 511 and capacitors 520 and 521, or modules (e.g., the modules shown in FIGS. 6-9 and 13).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter, comprising:
a conductive structure configured to generate a field;
a plurality of capacitors operatively connected to the conductive structure; and
a plurality of modules coupled to the plurality of capacitors, each module of the plurality of modules corresponds to a different capacitor of the plurality of capacitors and comprises a source, an inductor, and a transformer positioned between the source and the corresponding capacitor, wherein, for each module, the transformer is configured to couple an output of the source to the corresponding capacitor.

2. The wireless power transmitter of claim 1, wherein an electrical characteristic of each capacitor of the plurality of capacitors is based on at least an impedance of the conductive structure and a number of capacitors in the plurality of capacitors.

3. The wireless power transmitter of claim 1, wherein the plurality of capacitors maintain a tuning of the transmitter at a resonant frequency.

4. The wireless power transmitter of claim 1, wherein the plurality of capacitors are connected in parallel with the conductive structure.

5. The wireless power transmitter of claim 1, wherein each module of the plurality of modules is operatively connected to the different capacitor of the plurality of capacitors via the inductor of the module and the transformer of the module.

6. The wireless power transmitter of claim 1, wherein, for each module of the plurality of modules, the transformer is operatively connected between the capacitor of the plurality of capacitors and the inductor of the module.

7. The wireless power transmitter of claim 1, wherein at least one module of the plurality of modules forms a removable module.

8. The wireless power transmitter of claim 7, wherein the removable module may be removed while the transmitter is transmitting power.

9. The wireless power transmitter of claim 7, wherein the transmitter remains tuned without regard to whether any modules are removed.

10. The wireless power transmitter of claim 1, wherein the transmitter remains tuned without regard to a number of the sources that are enabled.

11. The wireless power transmitter of claim 1, further comprising a controller configured to monitor a parameter and determine a status of each module of the plurality of modules.

12. The wireless power transmitter of claim 11, wherein a module of the plurality of modules is operatively disconnected subsequent to the controller detecting a fault.

13. The wireless power transmitter of claim 1, wherein each module of the plurality of modules comprises a common center tap.

14. The wireless power transmitter of claim 13, wherein each source of the plurality of modules is powered by a common DC bus.

15. The wireless power transmitter of claim 1, wherein a disabled module of the plurality of modules is enabled upon the controller detecting an increased load.

16. The wireless power transmitter of claim 1, further comprising a plurality of controllers, each associated with a module of the plurality of modules and an electrical circuit of the plurality of electrical circuits, each controller configured to monitor a parameter of and to determine a status of the associated module and capacitor.

17. The wireless power transmitter of claim 16, wherein the plurality of controllers communicate via a communications link.

18. A method of wirelessly transmitting power, comprising:
 providing a current in a conductive structure connected to a plurality of capacitors via a plurality of modules, each module of the plurality of modules comprising a source, an inductor, and a transformer positioned between the source and a corresponding capacitor, wherein, for each module, the corresponding capacitor is a different capacitor of the plurality of capacitors;
 generating a magnetic field via the conductive structure; and
 for at least one module of the plurality of modules, operatively disconnecting the source from the conductive structure.

19. The method of claim 18, wherein the current remains substantially constant upon operatively disconnecting the source of fewer than all of the plurality of modules.

20. A wireless power transmitter, comprising:
 multiple means for providing power;
 means for generating a magnetic field operatively connected to multiple means for storing charge; and
 multiple means for connecting the multiple providing means to the generating means via the multiple storing means, each connecting means of the multiple connecting means corresponding to a different storing means of the multiple storing means positioned between the generating means and the connecting means, each providing means of the multiple providing means to contribute to a current in the generating means, the multiple connecting means comprising means for operatively disconnecting at least one providing means of the multiple providing means or at least one connecting means of the multiple connecting means from the generating means while continuing to provide the current in the generating means.

21. The wireless power transmitter of claim 20, wherein the current remains substantially constant upon disconnection of fewer than all of the multiple providing means or fewer than all of the multiple connecting means.

* * * * *